MEMORY WITH NOISE CANCELLATION
Filed Sept. 5, 1962
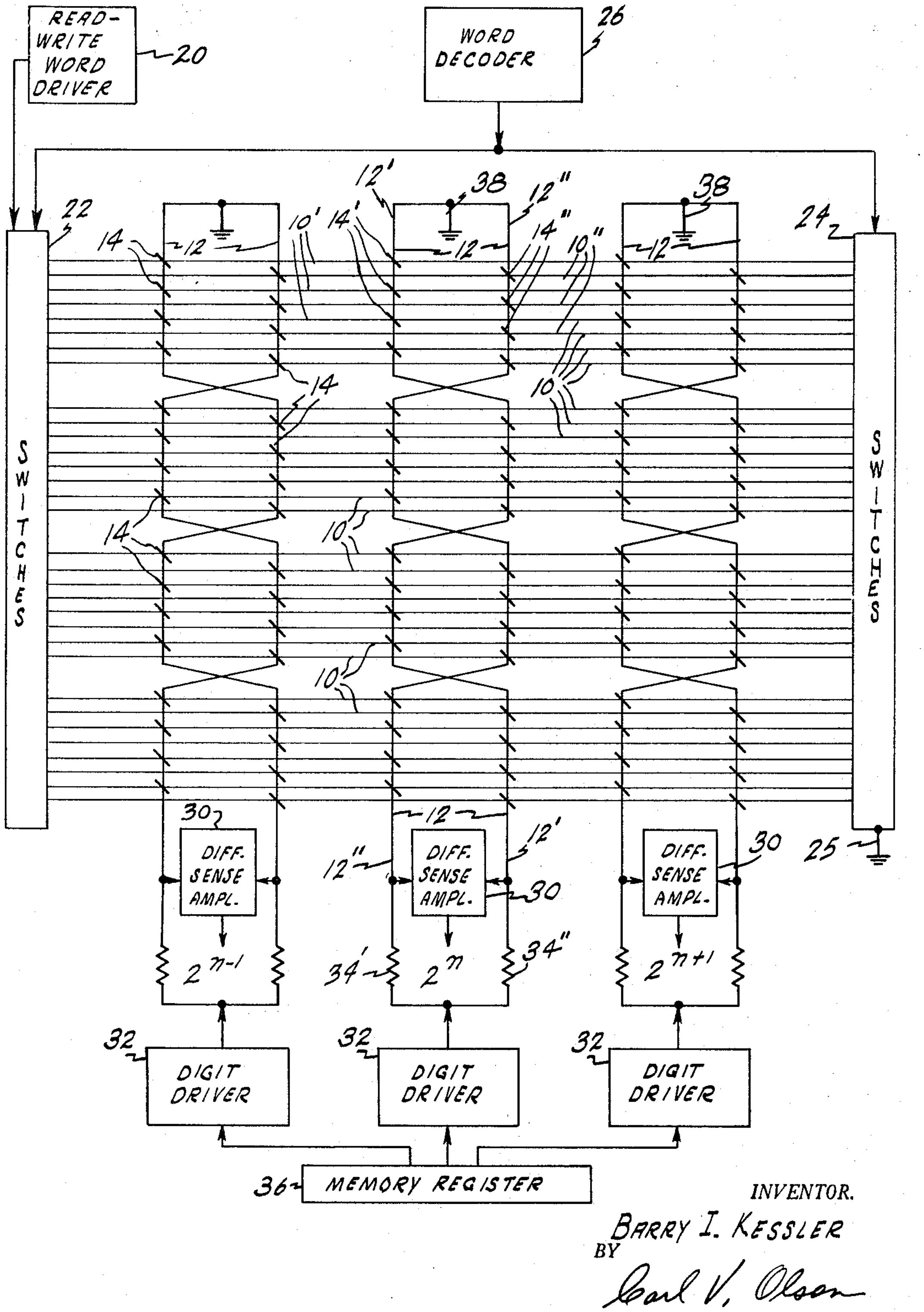
INVENTOR.
BARRY I. KESSLER
BY
Carl V. Olson
ATTORNEY 3,303,481

MEMORY WITH NOISE CANCELLATION

Barry I. Kessler, Cherry Hill, N.J., assignor to Radio Corporation of America, a corporation of Delaware Filed Sept. 5, 1962, Ser. No. 221,501
3 Claims. (Cl. 340—174)

This invention relates to memories, and particularly to random-access, word-organized arrays of magnetic memory elements which are useful, for example, in electronic data processing apparatus.

It is the object of this invention to provide an improved word-organized memory array which provides fast read-write operation, which is capable of compact construction in units having a large storage capacity and which is reliable in operation by virtue of effecting cancellation of undesired disturbing noise signals.

According to an example of the invention, there is provided a one-core-per-bit word-organized memory array having a plurality of parallel word lines (conductors) and a plurality of digit-sense line pairs each consisting of two periodically transposed conductors extending transversely with relation to the word lines. Solely one magnetic memory core is located at each crossover of a word line and a digit-sense line pair. Each core is linked by a word line and solely one of the conductors of a digit-sense line pair. Every two adjacent cores linked by one conductor of a digit-sense line pair are also linked by respective non-adjacent (alternate) word lines. A digit driver and a differential sense amplifier are provided for each digit-sense line pair. Each digit driver is coupled to both conductors of a pair and each differential sense amplifier has its two inputs coupled to respective ones of the two conductors of the pair.

The arrangement is one wherein undesired noise signals are coupled equally to the two conductors of each digit-sense line pair so that the noise signals are cancelled in the input circuit of the differential sense amplifier. The voltage resulting from the application of a digit pulse to a digit-sense line pair appears equally on the two conductors of the pair. This application of a digit pulse to one digit-sense line pair results in the coupling to an adjacent unenergized digit-sense line pair, of noise signals which (because of the periodic transposition of the two conductors of the pair) appear equally on the two conductors of the pair. The application of read and write pulses to a word line results in the coupling of equal noise components to the two conductors of each digit-sense line pair.

These and other objects and advantages of the invention will be apparent to those skilled in the art from the following more detailed description taken in conjunction with the appended drawing, wherein:

The sole figure of the drawing illustrates a magnetic memory constructed in accordance with the teachings of this invention.

Referring now in greater detail to the drawing, there is shown a plurality of word lines (conductors) 10 extending parallel to each other in one plane (or in folded planes). There is also shown a plurality of digit-sense line pairs 12 extending transversely with relation to the word lines 10. The word lines 10 and digit-sense line pairs 12 shown in the drawing are illustrative of a much larger array which may, for example, include units each having 512 word lines 10 intersected by 56 digit-sense pairs 12 to provide a random access memory unit capable of storing 512 words each having 56 information bits.

Each digit-sense line pair 12 consists of two conductors lying in a plane closely parallel to the plane of the word lines 10. The two conductors of each digit-sense pair are transposed at regular intervals so that each conductor is at one side during one-half its length and at the other side during the other half of its length.

One magnetic memory element, such as a ferrite core 14, is provided at each crossover of a word line 10 and a digit-sense line pair 12. The cores 14 are threaded or linked by the word lines 10 and the digit-sense line pairs 12 according to a scheme wherein the cores 14' linked by the non-adjacent alternate ones 10' of the word lines 10 are also linked by one of the conductors 12' of a digit-sense line pair, and wherein the cores 14" linked by non-adjacent intermediate word lines 10" are also linked by one conductor 12" of the digit-sense line pair. Stated another way, every two adjacent cores 14' (or 14") linked by one conductor 12' (or 12") of a digit-sense line pair 12 are also linked by respective non-adjacent alternate word lines 10' (or 10"). The arrangement is a one-core-per-bit memory arrangement wherein solely one magnetic memory core is located at each crossover of a word line pair and wherein each magnetic core is linked by a word line and solely one of the conductors of a digit-sense line pair. Each word line 10 thus links a number of cores 14 equal to the number of digit-sense line pairs 12, which is in turn equal to the number of information bits of each word.

A read-write word driver circuit 20 is connected to supply read and write pulses through switches 22, word lines 10 and switches 24 to a return path such as ground 25. The switches 22 and 24 determine which word line 10 will receive read and write pulses at any given cycle of operation. The switches are controlled by means of the usual word decoder 26.

At one end of each digit-sense line pair 12, the two conductors 12' and 12" are coupled to respective inputs of a sense amplifier 30. A digit driver circuit 32 is provided for each digit-sense pair 12 and it supplies digit pulses to both of the conductors 12' and 12" of a pair through respective resistors 34' and 34". The digit-driver circuits 32 operate under the control of the usual memory register 36. Both conductors 12' and 12" are connected, at the opposite end of each digit-sense line pair, to a common return path such as ground 38. The differential sense amplifiers 30 are provided with respective output leads which, in the drawing, are labeled $2^{n-1}$, $2^n$ and $2^{n+1}$, the designations identifying the successive binary bits of a sensed word.

Information is written into one word location in the memory illustrated in the drawing by applying a write pulse from the word driver circuit 20 through the word line 10 selected by the switches 22 and 24. Certain ones of the digit drivers 32 supply digit pulses concurrently to the digit-sense line pairs in accordance with whether the corresponding digits of the word are 1 or 0. The coincidence of a write pulse on the word line linking a core and a digit pulse on the digit-sense line conductor linking the core may be used to store a 1 (or to store a 0).

The coincident word and digit pulses may be either of adding polarities or subtracting polarities. The digits of a word are read from the memory by applying an opposite polarity read pulse from the word driver 20 to the selected word line 10. This causes a sense signal to be induced in one conductor of each digit-sense line pair linking a core that was storing a 1 (or a 0), and no sense signal in the conductor if it linked a core that was storing a 0 (or a 1). The induced signal is sensed by the corresponding differential sense amplifier 30.

A sense signal induced on a conductor 12' due to the switching of a core 14' is applied to one input of the corresponding sense amplifier, and a sense signal (of the same polarity) induced on a conductor 12'' as the result of the switching of a core 14' is applied to the other input of the sense amplifier. Therefore, the output of the differential sense amplifier may be either a positive pulse or a negative pulse. The output of the sense amplifier is applied through a full-wave rectifier (not shown) to provide pulses of one polarity. Alternatively, the sense signals induced on conductors 12' and 12'' may be made to have opposite polarities by arranging the word driver 20 to supply read-write pulses in one direction through alternate word lines 10' and in the opposite direction through intermediate word lines 10''. With this construction, the output signals from a differential sense amplifier 30 are always of the same polarity, and a full-wave rectifier is not needed.

The manner in which the arrangement of the memory reduces the disturbing effects of undesirable noise signals will now be described. The arrangement of the memory is such that noise signals are coupled in equal amplitudes and like polarities to both conductors 12' and 12'' of each digit-sense line pair 12, and are thus cancelled in the input circuit of each corresponding differential sense amplifier 30. The balancing and cancelling of noise originating during the write portion of a read-write cycle permits the memory to be designed for faster operation by making the read portion of the cycle occur a shorter time after the write portion than would otherwise be possible. The cancelling of noise during the read portion of the cycle provides more reliable sensing of the stored information.

More particularly, the application of a digit pulse from a digit driver 32 to both conductors of a digit-sense pair 12 results in an induced voltage on the conductors which is a function of the inductance presented by the threaded cores and the steepness of the leading and trailing edges of the digit pulse. This induced back voltage may be several orders of magnitude greater than the sense signal induced on a digit-sense line conductor. The back voltages on the digit-sense conductors 12' and 12'' are substantially equal in amplitude and are applied to the two inputs of the differential sense amplifier 30 where they cancel each other in the input circuit of the amplifier. Since the noise signals are thus cancelled, the sense amplifier is not saturated as it would be with a large unbalanced input, and the sense amplifier can quickly recover to sense the presence of a sense signal a short time later when a read pulse is applied to a word line.

In the absence of the arrangement wherein each digit-sense line pair is periodically transposed along its length, the application of a digit pulse to one digit-sense line pair would result in an unequal coupling of digit noise to the two conductors of an adjacent, unenergized digit-sense line pair. The resulting unbalanced signals on the two conductors of the adjacent pair constitutes a large disturbing noise signal at the sense amplifier of the adjacent pair. The transposing of the conductors of each digit-sense line pair results in the coupling of digit noise from an energized pair equally to the two conductors of an adjacent unenergized pair. The equal amplitude noise on the two conductors of the adjacent pair is cancelled in the input circuit of the corresponding differential sense amplifier.

There are also a balancing and cancellation of noise coupled to the two conductors of each digit-sense line pair from each word line 10 when a read or a write pulse is applied thereto. This type of noise is coupled capacitively (or inductively) from a word line to the two conductors of each digit-sense line pair. To achieve the desired balancing and cancelling effect, care should be taken in the construction of the memory so that the spacing between a word line and the two conductors of each digit-sense line pair is substantially equal. The noise reactively coupled in equal amplitudes to the two conductors of each pair is likewise cancelled in the input circuit of the differential sense amplifier.

Because the construction described has a magnetic core at only half of the crossovers of conductors, it might seem to result in a memory having larger physical dimensions than constructions according to the prior art. However, the reverse is true. The noise cancellation achieved by the construction permits the memory plane mats to be closer together than is otherwise practical, so that the memory can be made considerably more compact than a comparable prior art memory.

It is thus seen that according to the teachings of this invention, there is provided a memory array wherein compactness, reliability of sensing, and speed of operation are enhanced by the coupling of equal cancelling noise signals to the two inputs of each differential sense amplifier.

What is claimed is:

1. A word-organized memory array comprising
- a plurality of word lines,
- a plurality of digit-sense line pairs each consisting of two periodically transposed conductors extending transversely with relation to said word lines,
- solely one magnetic memory core located at each crossover of a word line and a digit-sense line pair, and linked by said word line and solely one of the conductors of said digit-sense line pair,
- a word driver coupled to each word line,
- a digit driver coupled to both conductors of each digit-sense line pair, and
- a differential sense amplifier having two inputs coupled respectively to the two conductors of each digit-sense line pair.

2. A word-organized memory array comprising
- a plurality of word lines,
- a plurality of digit-sense line pairs each consisting of two periodically transposed conductors extending transversely with relation to said word lines,
- solely one magnetic memory core located at each crossover of a word line and a digit-sense line pair, and linked by said word line and solely one of the conductors of said digit-sense line pair, every two adjacent cores linked by one conductor of a digit-sense line pair being also linked by respective non-adjacent word lines,
- a word driver coupled to each word line,
- a digit driver coupled to both conductors of each digit-sense line pair, and
- a differential sense amplifier having two inputs coupled respectively to the two conductors of each digit-sense line pair.

3. A one-core-per-bit word-organized memory array comprising
- a plurality of word lines,
- a plurality of digit-sense line pairs each consisting of two periodically transposed conductors extending transversely with relation to said word lines,
- solely one magnetic memory core located at each crossover of a word line and a digit-sense line pair, and linked by said word line and solely one of the conductors of said digit-sense line pair, every two adjacent cores linked by one conductor of a digit-sense line pair being also linked by respective non-adjacent word lines,
- a word driver coupled to each word line,
- a digit driver coupled to both conductors at one end of each digit-sense line pair,
- a return path coupled to both conductors at the opposite end of each digit-sense line pair, and
- a differential sense amplifier having two inputs coupled respectively to the two conductors of each digit-sense line pair at said one end.

References Cited by the Examiner

UNITED STATES PATENTS 3,142,049 7/1964 Crawford ----------- 340—174

OTHER REFERENCES

Publication I, IBM Technical Disclosure Bulletin; "High Speed Two Dimensional Memory Array," by E. D. Council, vol. 2, No. 3, October 1959; pp. 46 and 47.

References Cited by the Applicant

IBM Technical Disclosure Bulletin, vol. 3, No. 1, June 1960, page 45; G. Constantine, Jr., "Memory Plane Having Combination Sense-Inhibit Winding."

BERNARD KONICK, *Primary Examiner.*

J. W. MOFFITT, *Assistant Examiner.*